United States Patent [19]

Mensch

[11] Patent Number: 5,363,951
[45] Date of Patent: Nov. 15, 1994

[54] OVER AND UNDER BELT CONVEYOR SYSTEM

[75] Inventor: William A. Mensch, Farmington, Mich.

[73] Assignee: Jervis B. Webb Company, Farmington Hills, Mich.

[21] Appl. No.: 62,425

[22] Filed: May 17, 1993

[51] Int. Cl.⁵ .............................................. B65G 15/24
[52] U.S. Cl. ................................. 198/606; 198/835; 198/815
[58] Field of Search ............... 198/804, 839, 835, 561, 198/831, 606, 813, 814, 815

[56] References Cited

U.S. PATENT DOCUMENTS

| | | | |
|---|---|---|---|
| 1,614,816 | 1/1927 | York. | |
| 2,979,187 | 4/1961 | Erickson | 198/839 |
| 3,139,970 | 7/1964 | Mordstein | 198/839 |
| 3,275,126 | 9/1966 | Hartzell, Jr. | 198/815 |
| 3,326,355 | 6/1967 | Phillips | 198/815 |
| 3,753,488 | 8/1973 | Wilson | 198/815 |
| 3,915,293 | 10/1975 | Melchiorre et al. | 198/803.15 X |
| 4,032,003 | 6/1977 | Hull. | |
| 5,056,047 | 10/1991 | Rosenbaum. | |

FOREIGN PATENT DOCUMENTS

| | | | |
|---|---|---|---|
| 878020 | 5/1953 | Germany | 198/815 |
| 550642 | 1/1943 | United Kingdom | 198/815 |
| 394273 | 1/1974 | U.S.S.R. | 198/815 |
| 431075 | 4/1975 | U.S.S.R. | 198/815 |
| 1324899 | 7/1987 | U.S.S.R. | 198/815 |

Primary Examiner—D. Glenn Dayoan
Attorney, Agent, or Firm—Joseph W. Farley

[57] ABSTRACT

An endless belt conveyor has vertically spaced, oppositely moving, upper and lower load carrying runs having entrance and exit ends, with the entrance end of one run being adjacent to the exit end of the other run. A first series of rollers disposed between the exit end of the upper run and the entrance end of the lower run direct the belt downwardly, around a drive roller driven by a first drive unit, around a dynamic takeup roller, toward the entrance end of the lower run along a first depressed section of belt travel below the level of the lower run, and upwardly to the entrance end of the lower run from a static takeup installed below the lower run. A second series of rollers disposed between the exit end of the lower run and the entrance end of the upper run direct the belt downwardly from the lower run exit end, along a second depressed section of belt travel below the level of the lower run, around a drive roller driven by a second drive unit, around a dynamic takeup roller, and upwardly to the entrance end of the upper run. Lower run feed and take-away conveyors, respectively arranged above the first and second depressed sections of belt travel, converge into and diverge from alignment with the lower run entrance and exit ends for the in-line transfer of articles to and from the lower run. Upper run feed and take-away conveyors are aligned longitudinally with the upper run entrance and exit ends. Load sharing of the first and second drive units is provided by the use of NEMA "B" type AC drive motors and by a fluid coupling connecting each motor to its speed reducer.

22 Claims, 4 Drawing Sheets

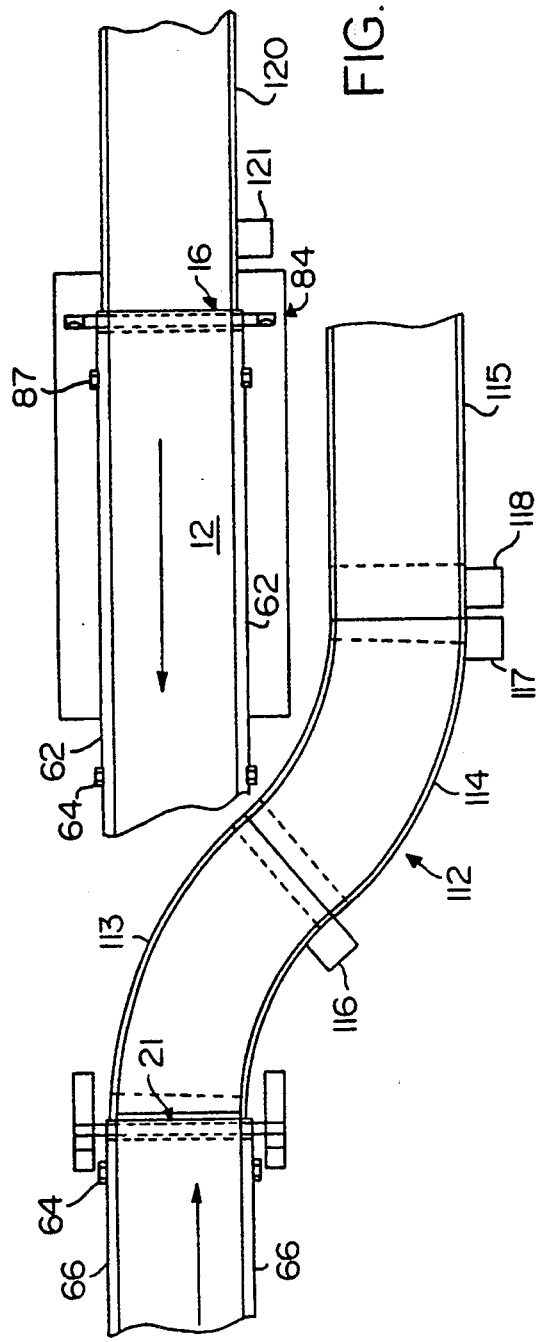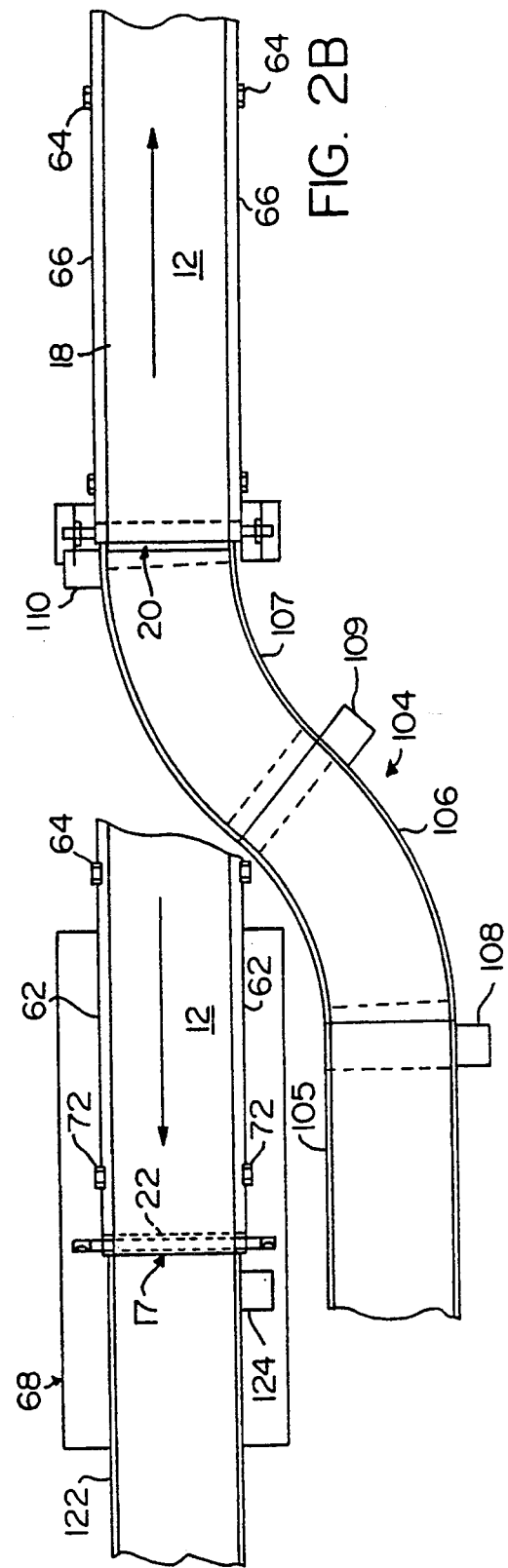

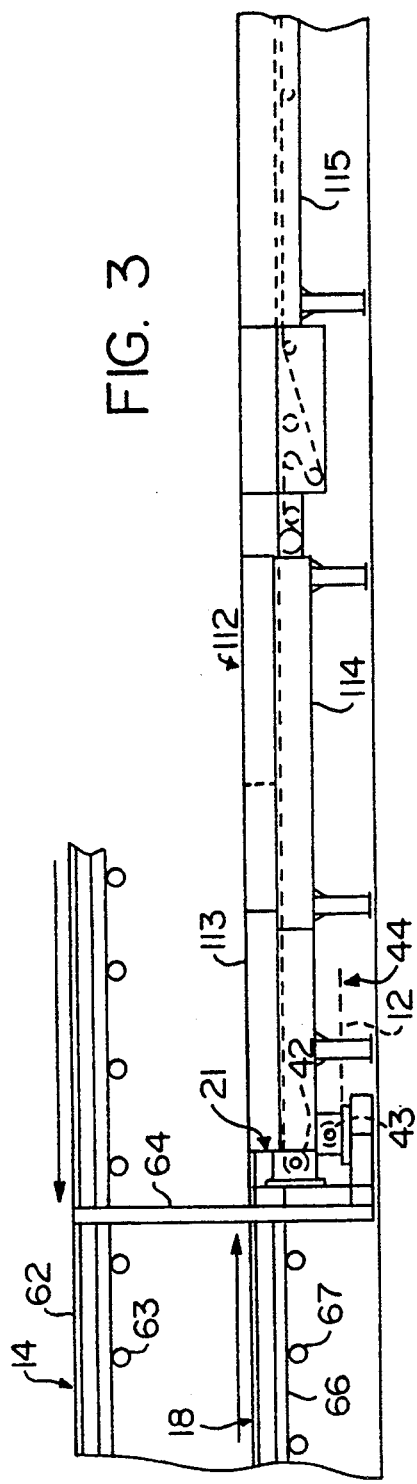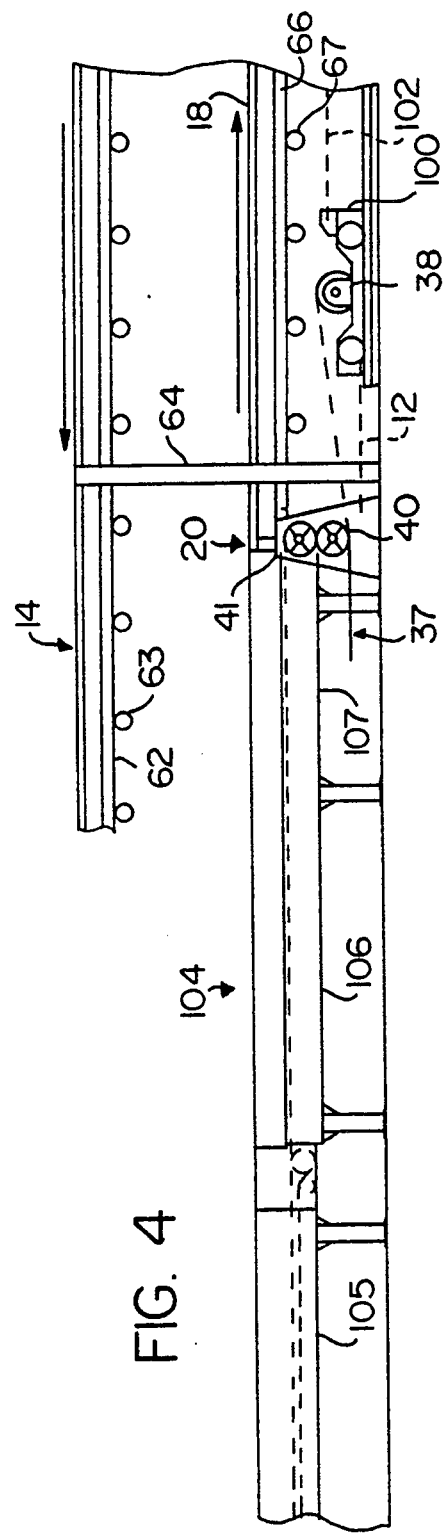
FIG. 3
FIG. 4

OVER AND UNDER BELT CONVEYOR SYSTEM

SUMMARY OF INVENTION

This invention relates to an endless belt conveyor having upper and lower vertically spaced, oppositely moving load carrying runs each having an entrance and an exit end; and, to a system in which feed and take-away conveyors are arranged for the in-line transfer of conveyed articles to the entrance and from the exit ends of the load carrying runs of the endless belt conveyor.

An over-and-under belt conveyor system of the invention comprises an endless belt, means supporting the belt for travel on an upper load carrying run having an entrance end and an exit end, and on a lower load carrying run spaced vertically below the upper run, the lower run having entrance and exit ends facing oppositely to the upper run entrance and exit ends. A lower run feed conveyor converges laterally into alignment with the lower run at the entrance end thereof, and a lower run take-away conveyor diverges laterally from alignment with the lower run at the exit end thereof. A first series of rollers direct the belt downwardly from the exit end of the upper run, horizontally below the lower run feed conveyor, and upwardly to the entrance end of the lower run. A second series of rollers direct the belt downwardly from the exit end of the lower run, horizontally below the lower run take-away conveyor, and upwardly to the entrance end of the upper run. At least one of the first and second series of rollers includes a belt drive roller, a drive unit coupled thereto, and a dynamic roller takeup on the downstream side of the drive roller for applying tension to the belt.

Alternatively, each of the first and second series of rollers may include a belt drive roller, a drive unit coupled thereto, and a dynamic takeup on the downstream side of the drive roller for applying tension to the belt.

Preferably, the lower run feed conveyor comprises a main feed conveyor disposed parallel to the path of travel of the belt and terminating to one side of the first series of rollers, a first curved section conveyor extending from the main feed conveyor toward the path of travel of the belt, and a second reverse curved section conveyor extending from the first curved section conveyor to the entrance end of the lower run. These main, first and second feed conveyors are driven, preferably independently, with the speed of the second feed conveyor approaching, or being substantially equal to, the speed of the belt.

The lower run take-away conveyor preferably comprises a main take-away conveyor extending in a direction parallel to the path of travel of the belt and originating at one side of the second series of rollers, a first curved section take-away conveyor extending from the exit end of the lower run laterally away from the path of travel of the belt, and a second reverse curved section take-away conveyor extending from the first to the main take-away conveyor. These main, first and second take-away conveyors are driven, preferably independently, with the speed of the first take-away conveyor being substantially equal to the speed of the belt.

In a preferred construction of the over-and-under belt conveyor of the invention, a pair of upper side frames and a series of upper idler rollers carried thereby support the belt from travel between the entrance and exit ends of the upper load carrying run, and a pair of lower side frames having a series of lower idler rollers carried thereby support the belt for travel between the entrance and exit ends of the lower load carrying run spaced vertically below the upper load carrying run. A first drive assembly is disposed between the exit end of the upper run and the adjacent, oppositely facing entrance end of the lower run, and a second drive assembly is disposed between the exit end of the lower run and the adjacent, oppositely facing entrance end of the upper run.

Each of the first and second drive assemblies includes frame structure, a belt drive unit including a belt drive roller attached to the frame structure, a takeup carriage movably supported by the frame structure, a takeup roller mounted on the carriage and biasing means connected to the carriage. The first drive assembly includes first idler rollers carried by the frame structure which define a path of travel of the belt from the exit end of the upper run around the drive roller, from the drive roller around the takeup roller and from the takeup roller toward the entrance end of the lower run. The second drive assembly includes second idler rollers carried by the frame structure which define a path of travel of the belt around the drive roller, around the takeup roller and from the takeup roller to the entrance end of the upper run, the drive roller of the second drive assembly being arranged to receive the belt from the exit end of the lower run.

Each of the entrance and exit ends of the lower run is defined by a terminal belt engaging roller, with a belt training roller being mounted vertically below the terminal roller. The first idler rollers direct the belt toward the training roller at the entrance end of the lower run along a first section of belt travel which is depressed below the level of the lower run. The training roller at the exit end of the lower run directs the belt to the drive roller of the second drive assembly along a second section of belt travel which is depressed below the level of the lower run.

An auxiliary takeup carriage, mounted below the pair of lower side frames and movable longitudinally of the lower run, supports a belt engaging takeup pulley which receives the belt at the downstream end of the first depressed section of belt travel and directs the belt to the training roller at the entrance end of the lower run. A selectively operable device, such as a winch, is provided for moving the auxiliary takeup carriage so that excess length of the belt can be taken up and proper positioning maintained for the takeup carriages of the drive assemblies.

Lower run feed and take-away conveyors can be provided, the feed conveyor converging into alignment with the entrance end of the lower run above the first depressed section of belt travel, and the take-away conveyor diverging from alignment with the exit end of the lower run above the second depressed section of belt travel. Feed and take-away conveyors for the upper run are aligned longitudinally therewith. Articles being conveyed are thus transferable in line to and from both the upper and lower runs at substantially equal speeds.

In some commercial uses of the invention—airport baggage handling, for example—the loading of the upper and lower runs of the conveyor may vary from each other, even to a condition in which one run is fully loaded and the other run is unloaded. The resulting unequal loading of drive units of the first and second drive assemblies is preferably compensated for by employing NEMA "B" type AC drive motors and by providing a fluid coupling between each drive motor and the speed reducer of its drive unit.

Other features and aspects of the invention will appear from the detailed description to follow of the embodiments shown in the accompanying drawings.

DESCRIPTION OF THE DRAWINGS

FIG. 2A is a plan view of the end portion of FIG. 1A;

FIG. 2B is a plan view of the end portion of FIG. 1B;

FIG. 3 is a side elevation corresponding to FIG. 2A showing the lower run take-away conveyor;

FIG. 4 is a side elevation corresponding to FIG. 2B showing the lower run feed conveyor;

DETAILED DESCRIPTION

Figure 5:
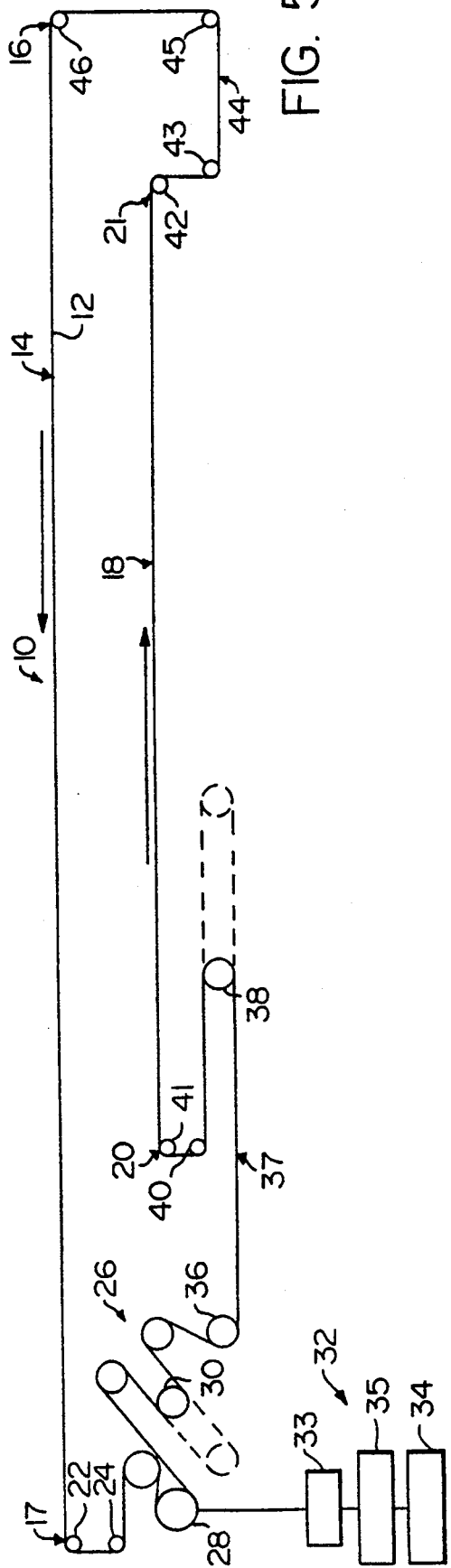
FIG. 5 is a schematic elevation of a belt conveyor of the invention provided with a drive assembly at one end thereof.
Figure 6:
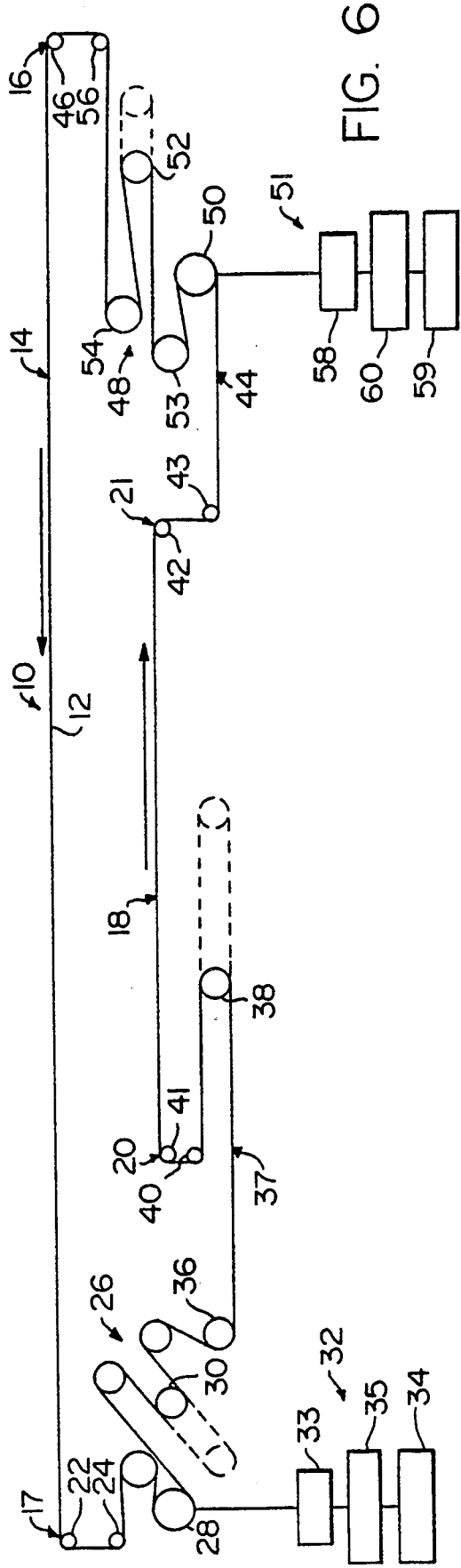
FIG. 6 is a schematic elevation of a belt conveyor of the invention provided with a drive assembly at each end thereof.

Referring to FIGS. 5 and 6 for a schematic overview of the invention, the belt conveyor 10 of FIG. 5 comprises an endless belt 12 supported (by means to be described) for travel on an upper load carrying run 14, having an entrance end 16 and an exit end 17; and, on a lower load carrying run 18 spaced vertically below the upper run 14 and having an entrance end 20 and an exit end 21 facing oppositely to the upper run entrance and exit ends. From the exit end 17 of the upper run 14, defined by a terminal roller 22, the belt 12 is directed downwardly by a training roller 24 to a roller cluster of a drive assembly 26 including a belt drive roller 28 and a dynamic takeup roller 30 on the downstream side of the drive roller 28. A drive unit 32 is coupled to the drive roller 28, and includes a speed reducer 33, a drive motor 34 and a fluid coupling 35 between the drive motor and the speed reducer.

An idler roller 36 at the downstream side of the drive assembly 26 directs the belt 12 toward the entrance end 20 of the lower run 18 along a section 37 of belt travel depressed below the level of the lower run 18. An auxiliary takeup roller 38, disposed below the lower run, may be provided in this depressed section of belt travel, as shown, and from this takeup roller 38 the belt 12 extends to a belt training roller 40 mounted vertically below a terminal belt engaging roller 41 defining the entrance end 20 of the lower run 18.

At the exit end 21 of the lower run 18, defined by a terminal roller 42, a belt training roller 43, mounted vertically below the terminal roller 42, directs the belt 12 along another section 44 of belt travel depressed below the level of the lower run 18 to a guide roller 45 from which the belt 12 extends to a terminal roller 46 defining the entrance end 16 of the upper run 14.

FIG. 6 illustrates the belt conveyor 10 of the invention provided with the roller cluster of a second drive assembly 48 disposed between the exit end 21 of the lower run 18 and the entrance end 16 of the upper run 14 and comprising a drive roller 50 connected to a drive unit 51, and a dynamic takeup roller 52 on the downstream side of the drive roller. Idler rollers 53 and 54 define a path of travel of the belt 12 around the drive roller 50, from the drive roller around the takeup roller 52 and from the takeup roller toward the entrance end 16 of the upper run 14 provided with a training roller 56 mounted vertically below the terminal roller 46. The drive unit 51, like the drive unit 32, includes a speed reducer 58 driven by a motor 59 through a fluid coupling 60.

Figure 1A:
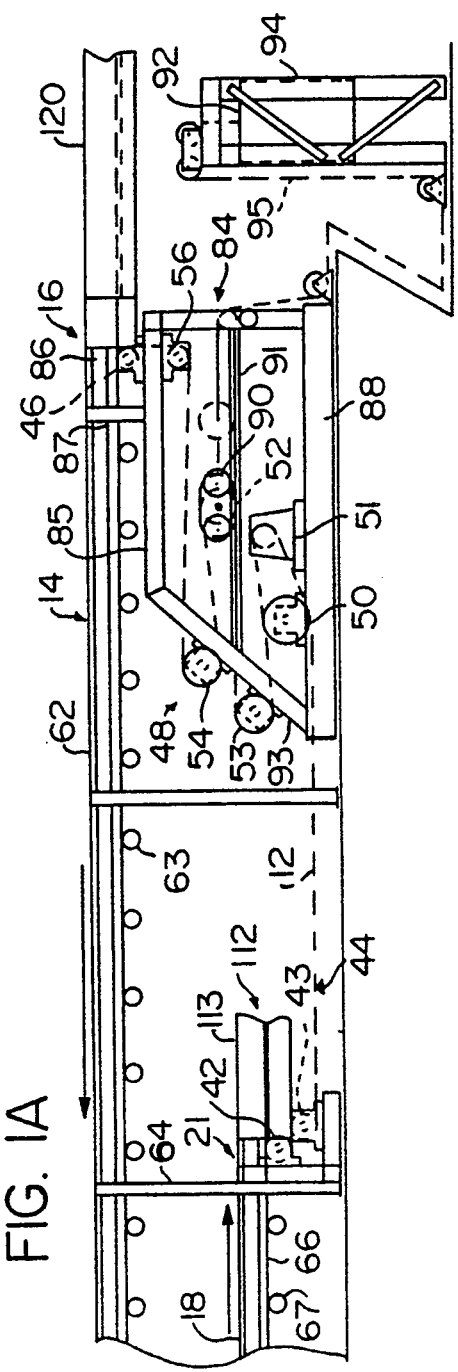
FIG. 1A is a side elevation showing one end portion of a belt conveyor installation of the invention.

Details of the multiple-drive type conveyor 10 of FIG. 6, together with feed and take-away conveyors for the in-line transfer of articles being conveyed to the entrance end and from the exit end of each of the upper and lower load carrying runs 14 and 18, are illustrated in FIG. 1A through FIG. 4. In these views, reference numbers identical to those used in FIG. 6 have been employed for corresponding components of the conveyor 10. FIGS. 1A, 2A and 3 show the conveyor system at the entrance end 16 of the upper run 14 and the exit end 21 of the lower run 18; and, FIGS. 1B, 2B and 4 show the conveyor system at the exit end 17 of the upper run and the entrance end 20 of the lower run.

The conveyor 10 in these views comprises a pair of upper side frames 62 having a series of upper idler rollers 63 carried thereby for supporting the endless belt 12 for travel on the upper load carrying run 14, the side frames 62 being mounted on pairs of vertical supports 64 spaced apart at suitable intervals along the length of the conveyor. A pair of lower side frames 66 attached to the supports 64 vertically below the upper side frames carry a series of lower idler rollers 67 which support the belt 12 for travel on the lower load carrying run 18. The drive assembly 26, hereafter referred to as the first drive assembly, is disposed between the exit end 17 of the upper run and the entrance end 20 of the lower run, as shown in FIGS. 1B and 2B; and, the second drive assembly 48 is disposed between the exit end 21 of the lower run and the entrance end 16 of the upper run, as shown in FIGS. 1A and 2A.

The first drive assembly 26 comprises frame structure 68 mounted below the pair of upper side frames 62. This frame structure 68 includes an upper, horizontally extending portion 70 for supporting the ends 71 of the side frames through a pair of vertical posts 72 and for supporting in vertical alignment the exit end terminal roller 22 of the upper run and the training roller 24 mounted below the terminal roller. Extending obliquely downwardly from the upper portion 70 and towards the entrance end of the lower run is a frame portion 74 from which perpendicularly extends a downwardly inclined frame portion 75 having upper and lower levels. The belt drive roller 28 is attached to the upper level of the frame portion 75 and is connected to the drive unit 32 mounted on a pedestal base 76 of the frame structure. Movably supported on the lower level of the downwardly inclined frame portion 75 is a takeup carriage 78 on which the takeup roller 30 is mounted, the carriage 78 and roller 30 being dynamically biased to apply tension to the belt 12 by a counterweight 80 mounted in a supporting frame 81 spaced from the frame structure 68 and connected to the takeup carriage 78 by a cable 82.

Frame structure 84 of the second drive assembly 48 is similarly mounted below the pair of upper side frames 62. An upper horizontal frame portion 85 supports the entrance ends 86 of the upper side frames 62 through vertical posts 87, and supports the pair of vertically spaced rollers consisting of the terminal roller 46 defining the entrance end of the upper run, and the training roller 56. A base portion 88 of the frame structure 84 supports the belt drive roller 50 and the drive unit 51. A takeup carriage 90, on which the takeup roller 52 is mounted, is movably supported on a frame portion 91 intermediate the upper and base frame portions 85 and 88 and connected to a vertical support and to an oblique support 93. The takeup carriage 90 is dynamically biased in a direction such as to apply tension to the belt 12 by a counterweight 92 suspended in a separate structure 94 and connected by a cable 95 to the carriage 90.

Figure 1B:
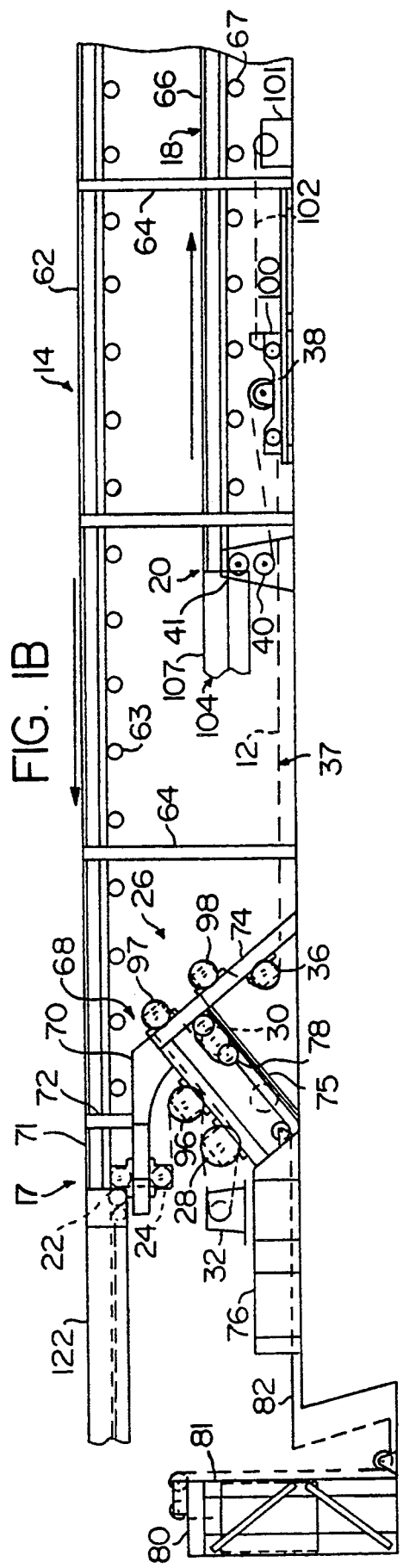
FIG. 1B is a side elevation showing the opposite end portion of the conveyor installation of FIG. 1A.

Referring again to first drive assembly 26 of FIG. 1B, the endless belt 12 travels from the terminal roller 22 at the exit end 17 of the upper run 14 to the training roller 24, and from the training roller in a path of travel which is defined by successive idler rollers 96, 97, and 98 carried by the frame structure 68, and which extends around the drive roller 28, around the takeup roller 30 and downwardly around the idler roller 36 toward the entrance end 20 of the lower run 18 along the depressed section 37 of belt travel. The auxiliary takeup pulley 38 provided in this section 37 is supported on a carriage 100 mounted on rails below the side frames 66 of the lower run for movement longitudinally thereof by selective operation of a suitable device such as a winch 101 connected to the carriage by a cable 102. The takeup pulley 38 receives the belt 12 from the idler roller 36 at the downstream side of the first drive assembly 26 and directs the belt to the training and terminal rollers 40, 41 at the entrance end of the lower run.

At the exit end 21 of the lower run, shown in FIG. 1A, the belt 12 passes over the terminal roller 42, is directed downwardly under the training roller 43, and travels on the second depressed section 44 to the drive roller 50 of the second drive assembly 48. The idler rollers 53 and 54 are mounted on the oblique support 93 of the frame structure 84 and direct the belt 12 around the drive roller 50, to the takeup roller 52, and from the takeup roller to the training roller 56 below the entrance end 16 of the upper run.

As shown in FIGS. 1B, 2B and 4, a lower run feed conveyor 104 converges laterally into alignment with the lower run 18 at the entrance end 20 thereof and comprises a main feed conveyor 105, a first curved section conveyor 106, and a second reverse curved section conveyor 107. The main feed conveyor 105 is disposed parallel to the path of travel of the belt 12, terminates to one side of the first drive assembly frame 68, and is provided with a drive unit 108; the first curved section conveyor 106 extends from the main feed conveyor toward the path of travel of the belt 12, terminates to one side thereof, and is provided with a drive unit 109; and, the second reverse curved section conveyor 107, provided with a drive unit 110, extends from the first curved section conveyor to the lower run entrance end 20 above the level of the depressed section 37 of travel of the belt 12. The drive units 108, 109 and 110 of these successive feed conveyors are independent and may be operated at progressively increasing speeds so that the speed of the second conveyor 107 approaches or substantially equals the speed at which the belt 12 is driven.

An oppositely arranged, lower run take-away conveyor 112, shown in FIGS. 1A, 2A and 3, diverges laterally from alignment with the exit end 21 of the lower run above the second depressed section 44 of travel of the belt 12. A curved section conveyor 113 extends from the exit end 21 to a reverse curved section conveyor 114 which in turn extends to a main lower run take-away conveyor 115 located at one side of the second drive assembly frame 84 and extending in a direction parallel to the path of travel of the belt 12. Independent drive units 116, 117 and 118 provided for the conveyors 113, 114 and 115 respectively, may be operable at speeds progressively decreasing from a speed equal to or approximating the speed of the belt 12.

An upper run feed conveyor 120 driven by a drive unit 121 extends to the entrance end 16 of the upper run 14 of the conveyor 10, as shown in FIGS. 1A and 2A. FIGS. 1B and 2B include an upper run take-away conveyor 122 extending from the exit end 17 of the upper run 14 and provided with a drive unit 124.

The upper run feed and take-away conveyors 120 and 122 together with the lower run feed and take-away conveyors 104 and 112 provide for the in-line transfer of articles being conveyed to and from the upper and lower runs 14 and 18 of the conveyor 10, whether driven by a single drive assembly, as schematically shown in FIG. 5, or by multiple drive assemblies as shown in FIGS. 1A–4 and 6. These transfers are facilitated by preferably employing rollers having a diameter not exceeding 6" for the terminal rollers 46 and 22 at the entrance and exit ends 16 and 17 of the upper run 14 and for the terminal rollers 41 and 42 at the entrance and exit ends of the lower run 18. The wrap of and belt 12 around each terminal roller is limited to 90° by the training roller paired therewith in vertically aligned relation.

Whether the conveyor 10 is provided with a single drive assembly or with multiple drive assemblies will depend mainly on the length of the conveyor 10 and the maximum load it is required to convey. In a conveyor 10 having a single drive assembly 26, as in FIG. 5 (constructed as in FIG. 1B), the drive unit 32 preferably includes the fluid coupling 35 in order to limit the acceleration force transmitted to the belt 12 during a start, particularly when the belt 12 is loaded, thereby eliminating shock loading of the drive train and slippage between the drive roller 28 and the belt 12.

Positive traction between the drive roller 28 and the belt 12 depends upon the tension applied to the belt by the counterweight biased movement of the takeup carriage 78 on which the takeup roller 30 is mounted. This tension must be of a magnitude such that zero tension does not exist at any point in the belt 12 in the stopped condition. To guard against loss of this tension, a limit switch is installed so as to be actuatable by the takeup carriage 78 upon substantial loss of travel distance, and shut down the drive unit 32. Should such a takeup induced shut down occur due to stretch of the belt 12, excess belting can be absorbed by operating the winch 101 connected to the carriage 100 of the auxiliary, static takeup roller 38, returning the dynamic takeup carriage 78 to proper operational position.

A conveyor 10 in which the belt 12 is driven by the first and second drive assemblies 26 and 48 involves additional design considerations. The installation of these drive assemblies at the opposite ends of the conveyor results in continuous, uninterrupted upper and lower load carrying runs 14 and 18 and in the in-line loading and unloading of these runs by the upper and lower run feed and take-away conveyors. Actual loading of these runs during the operation of the conveyor can vary to an extreme condition in which one run is fully loaded and the other run is unloaded.

If the belt 12 is of standard fabric construction having some elasticity, which is preferred, unequal loading of the upper and lower runs 14 and 18 will result in unequal stretch of the belt on those runs. This unequal stretch problem is resolved by the provision of the dynamic takeup rollers 30 and 52 immediately following the drive rollers 28 and 50 of the respective first and second drive assemblies. However, unequal loading of the upper and lower runs 14 and 18 will also cause unequal loading of the drive motors 34 and 59 of the first and second drive assemblies and a speed difference between the two motors. As the faster motor of the two is loaded the least, its drive roller will add tension to the more lightly loaded run of the belt and will attempt to stretch the belt to make up for any difference in belting length due to load stretch. The more lightly loaded motor thus adds more load to itself and in time will slow down and start to share load with the other motor. The belt carcass under this increased stretch tension becomes an effective mechanical link that will cause the two drive units to load share over a time period which will depend primarily upon the modulus of elasticity of the belt 12 and the distance between the two drive assemblies.

Compensation for unequal loading is preferably provided in part by the use of standard AC electric motors with NEMA "B" typical torque and current curves for the drive motors 34 and 59 of the two drive units 33 and 51. Such NEMA "B" AC motors are load sensitive and have a slip characteristic which can overcome the differences in loading. The fluid couplings 35 and 60 installed between the drive motors 34 and 59 and their respective speed reducers 33 and 58 for providing smooth acceleration of the loaded conveyor 10 also provide additional load balancing. Such additional load balancing compensates also for the stiffening of the belt 12 which will occur as the belt is run-in and ages, and which will tend to increase the time interval required for load sharing to take place.

Each of these fluid couplings 35 and 60 is a standard commercially available unit having an impeller and a runner operating in an oil-filled housing, the impeller being connected to the drive motor and the runner being connected to the speed reducer. When the drive motor is started, the impeller throws oil which impinges on the blades of the runner and produces a torque on the runner proportional to the weight and rate of the oil flow. Each coupling is selected so as to control the acceleration force transmitted to the conveyor belt 12 and so as to be capable, without overheating, of slipping the maximum torque resulting from unequal loading of the upper and lower runs 14 and 18 over the maximum time period required for load sharing.

When a conveyor 10 having two drive assemblies is first installed, the belt 12 is initially tensioned in a static condition. Since the amount of travel of the dynamic takeup rollers 30 and 52 is relatively limited in order to maintain compactness of the drive assemblies 26 and 48, the static takeup winch 101 is operated to remove installation slack, manufacturers stretch of the belt 12 and to properly adjust the position of the carriages 78 and 90 of the dynamic takeups. After this initial tensioning, the drive units 32 and 51 are started and the conveyor is operated until non-uniform sag of the belt 12 between the support rollers 63 and 67 of the upper and lower runs 14 and 18 is removed and the tensioning throughout the belt 12 reaches a stable condition. This operation, including resetting of the dynamic takeup carriages by the static takeup, may have to be done more than once in order to arrive at an initial tension such that the sag of the belt 12 between successive support rollers 63 and 67 is minimal and such that zero tension does not exist at any point in the belt 12 in the stopped condition. Sag between successive support rollers causes vertical movement of articles being conveyed and impact forces against the support rollers, which forces also tend to damage the carcass of the belt 12.

The multiple drive conveyor 10 is designed to be operable over a relatively long distance (e.g. 1500 feet) and at a relatively high speed (e.g. 500 feet per minute), and when combined with the feed and take-away conveyors provides for the two-way conveyance of articles under varying load conditions as in the handling of outbound and inbound baggage at an airport.

I claim:

1. An over-and-under belt conveyor system comprising:

an endless belt;

means supporting said belt for travel on an upper load carrying run having an entrance end and an exit end, and on a lower load carrying run spaced vertically below said upper run, said lower run having entrance and exit ends facing oppositely to said upper run entrance and exit ends;

a lower run feed conveyor converging laterally into alignment with said lower run at the entrance end thereof, and a lower run take away conveyor diverging laterally from alignment with said lower run at the exit end thereof;

a first series of roller means for directing said belt downwardly from said upper run exit end, horizontally below said lower run feed conveyor, and upwardly to said lower run entrance end;

a second series of roller means for directing said belt downwardly from said lower run exit end, horizontally below said lower run take away conveyor, and upwardly to said upper run entrance end; and at least one of said first and second series of roller means including a belt drive roller, a drive unit coupled thereto, and dynamic takeup roller means on the downstream side of said drive roller for applying tension to said belt.

2. An over-and-under belt conveyor system according to claim 1 wherein one of said first and second series of roller means includes an auxiliary takeup disposed below said lower run, said auxiliary takeup being operable to adjust said dynamic takeup roller means.

3. An over-and-under belt conveyor system according to claim 1 wherein each of said first and second series of roller means include a belt drive roller, a drive unit coupled thereto, and dynamic takeup roller means on the downstream side of said drive roller for applying tension to said belt.

4. An over-and-under belt conveyor system according to claim 3 wherein each drive unit comprises a drive motor, a speed reducer connected to said drive roller, and a fluid coupling between said drive motor and said speed reducer.

5. An over-and-under belt conveyor system according to claim 4 wherein said drive motor is a NEMA "B" type AC motor.

6. An over-and-under belt conveyor system according to claim 3 further comprising auxiliary takeup means for adjusting said dynamic takeup roller means, said auxiliary takeup means being disposed below said lower run.

7. An over-and-under belt conveyor system according to claim 1 wherein each of said first and second series of roller means comprises:

frame structure mounted below said upper run;

a pair of vertically spaced belt engaging rollers carried by said frame structure, the upper one of said pair of rollers defining one end of said upper run;

said frame structure including means for supporting said belt drive roller and said drive unit;

said dynamic takeup roller means including a carriage movably supported on said frame structure, a takeup roller mounted on said carriage, and biasing means connected to said carriage; and idler roller means carried by said frame structure for training said belt around said drive roller and from said drive roller around said takeup roller.

8. An over-and-under belt conveyor system according to claim 7 wherein said biasing means comprises a counterweight, a counterweight supporting frame spaced from said frame structure, and a cable connecting said takeup carriage to said counterweight.

9. An over-and-under belt conveyor system according to claim 1 wherein said lower run feed conveyor comprises:

a main feed conveyor disposed parallel to the path of travel of said belt and terminating to one side of said first series of roller means, a first curved section feed conveyor extending from said main feed conveyor toward the path of travel of said belt, a second reverse curved feed section conveyor extending from said first curved section conveyor to the entrance end of said lower run, and means for driving each of said main, first and second feed conveyors.

10. An over-and-under belt conveyor system according to claim 9 wherein said driving means comprises an independent drive unit for each of said main, first and second feed conveyors whereby said main, first and second feed conveyors are operable at progressively increasing speeds with the speed of said second feed conveyor approaching the speed of said belt.

11. An over-and-under belt conveyor system according to claim 9 wherein said lower run take-away conveyor comprises:

a main take-away conveyor extending in a direction parallel to the path of travel of said belt and originating to one side of said second series of roller means, a first curved section take-away conveyor extending from the exit end of said lower run laterally away from the path of travel of said belt, a second reverse curved section take-away conveyor extending from said first curved section take-away conveyor to said main take-away conveyor, and means for driving each of said main, first and second take-away conveyors.

12. An over-and-under belt conveyor system according to claim 11 wherein said driving means comprises an independent drive unit for each of said main, first and second take-away conveyors, said first take-away conveyor being operable at a speed substantially equal to the speed of said belt.

13. An over-and-under belt conveyor comprising:
an endless belt;

a pair of upper side frames and a series of upper idler rollers carried thereby for supporting said belt for travel on an upper load carrying run having an entrance end and an exit end;

a pair of lower side frames and a series of lower idler rollers carried thereby for supporting said belt for travel on a lower load carrying run spaced vertically below said upper load carrying run, said lower load carrying run having entrance and exit ends facing oppositely to said upper run ends;

a drive assembly disposed between the exit end of one of said upper and lower runs and the entrance end of the other of said upper and lower runs, said drive assembly comprising frame structure mounted below said upper side frames, a belt drive roller, a drive unit coupled to said drive roller, said drive roller and drive unit being attached to said frame structure, a takeup including a carriage movably supported by said frame structure, a takeup roller mounted on said carriage, and biasing means connected to said carriage;

idler roller means carried by said frame structure for defining a path of travel of said belt around said drive roller, from said drive roller around said takeup roller, and from said takeup roller toward the entrance end of the other of said upper and lower runs;

and guide roller means for directing said belt between the ends of said upper and lower runs opposite to the exit and entrance ends between which said drive assembly is disposed.

14. An over-and-under belt conveyor according to claim 13 wherein each of the entrance and exit ends of said lower run is defined by a terminal belt engaging roller, a belt training roller mounted vertically below said terminal roller, each of said belt training rollers defining a portion of a path of travel of said belt below the level of said lower run to the entrance and from the exit end thereof.

15. An over-and-under belt conveyor according to claim 14 further comprising auxiliary takeup means mounted on the downstream side of said drive assembly for adjusting the position of said movable takeup carriage.

16. An over-and-under belt conveyor comprising:
an endless belt;

a pair of upper side frames and a series of upper idler rollers carried thereby for supporting said belt for travel on an upper load carrying run having an entrance end and an exit end;

a pair of lower side frames and a series of lower idler rollers carried thereby for supporting said belt for travel on a lower load carrying run spaced vertically below said upper load carrying run, said lower load carrying run having entrance and exit ends facing oppositely to said upper run ends;

a first drive assembly disposed between the exit end of said upper run and the entrance end of said lower run, a second drive assembly disposed between the exit end of said lower run and the entrance end of said upper run, each of said first and second drive assemblies comprising frame structure, a belt drive unit attached to said frame structure, said drive unit including a belt drive roller, a takeup carriage movably supported by said frame structure, a takeup roller mounted on said carriage, and biasing means connected to said carriage;

said first drive assembly including first idler roller means carried by the frame structure thereof for defining a path of travel of said belt from the exit end of said upper run around said drive roller, from said drive roller around said takeup roller and from said takeup roller toward the entrance end of said lower run; and said second drive assembly including second idler roller means carried by the frame structure thereof for defining a path of travel of said belt around said drive roller, around said takeup roller and from said takeup roller to the entrance end of said upper run, said drive roller of said second drive assembly being arranged to receive said belt from the exit end of said lower run.

17. An over-and-under belt conveyor according to claim 16 further comprising auxiliary takeup means mounted below said pair of lower side frames between said first and second drive assemblies for adjusting the positions of the movable takeup carriages thereof.

18. An over-and-under belt conveyor according to claim 16, wherein said drive unit of each of said first and second drive assemblies comprises a drive motor, a speed reducer connected to said drive roller, and a fluid coupling between said drive motor and said speed reducer.

19. An over-and-under belt conveyor according to claim 18 wherein said drive motor is a NEMA "B" type AC motor.

20. An over-and-under belt conveyor according to claim 16 wherein each of the entrance and exit ends of said lower run is defined by a terminal belt engaging roller, a belt training roller mounted below said terminal roller;

said first idler roller means is arranged to direct said belt toward said belt training roller at the entrance end of said lower run along a first section of belt travel depressed below the level of said lower run, and said belt training roller at the exit end of said lower run directs said belt to the drive roller of said second drive assembly along a second section of belt travel depressed below the level of said lower run.

21. An over-and-under belt conveyor according to claim 20 further comprising a lower run feed conveyor converging into alignment with the entrance end of said lower run above said first depressed section of belt travel, and a lower run take away conveyor diverging from alignment with the exit end of said lower run above said second depressed section of belt travel.

22. An over-and-under belt conveyor according to claim 20 further comprising auxiliary takeup means mounted below said pair of lower side frames between said first and second drive assemblies, said auxiliary takeup means comprising an auxiliary takeup carriage mounted for movement longitudinally of said lower run, selectively operable means for moving said auxiliary takeup carriage, a belt engaging takeup pulley supported on said auxiliary takeup carriage, said takeup pulley being arranged to receive said belt from said first idler roller means and to direct said belt to said belt training roller at the entrance end of said lower run.

* * * * *